United States Patent [19]

Greer

[11] 4,061,161

[45] Dec. 6, 1977

[54] ANTI-EXTRUSION GROMMET ASSEMBLY FOR PRESSURE ACCUMULATOR LIQUID VALVE

[75] Inventor: Edward M. Greer, Beverly Hills, Calif.

[73] Assignee: EMG Hydraulics, Inc., Santa Monica, Calif.

[21] Appl. No.: 660,365

[22] Filed: Feb. 23, 1976

[51] Int. Cl.² .................................................. F16L 55/04
[52] U.S. Cl. ........................................... 138/30; 277/178; 285/208
[58] Field of Search ............................. 138/30; 85/8.8; 137/207; 277/178; 285/208

[56] References Cited

U.S. PATENT DOCUMENTS

| 2,710,630 | 6/1955 | Greer | 138/30 |
| 2,936,787 | 5/1960 | Mercier | 138/30 |
| 3,316,939 | 5/1967 | Mercier | 138/30 |
| 3,537,481 | 11/1970 | Mercier | 138/30 |
| 3,687,165 | 8/1972 | Mercier | 138/30 |
| 3,784,237 | 4/1974 | Zirps | 285/208 |

*Primary Examiner*—Richard E. Aegerter
*Assistant Examiner*—Richard R. Stearns
*Attorney, Agent, or Firm*—Keith D. Beecher

[57] ABSTRACT

An anti-extrusion grommet assembly is provided for releasably retaining a tubular valve housing in the liquid port of a bladder-type pressure accumulator. The grommet assembly of the invention is constructed to preclude any possibility of the valve housing from being blown out through the port in the presence of normal operating pressures within the accumulator shell. The assembly is particularly intended for use with relatively small sized accumulators of, for example, capacities of the order of one gallon.

2 Claims, 5 Drawing Figures

ANTI-EXTRUSION GROMMET ASSEMBLY FOR PRESSURE ACCUMULATOR LIQUID VALVE

RELATED PATENT APPLICATION

Ser. No. 603,339, filed Aug. 11, 1975 for Edward M. Greer.

BACKGROUND OF THE INVENTION

Pressure accumulators are widely used in many types of hydraulic systems. One type of pressure accumulator comprises a thimble-shaped flexible bladder mounted in a generally cylindrical shaped rigid shell, the bladder serving to separate the interior of the shell into two separate compartments which are sealed from one another. A "liquid port" is provided at one end of the shell which communicates with one of the compartments, termed the "liquid compartment"; and a valved "gas port" is provided at the other end of the shell which communicates with the other compartment, termed the "gas compartment."

A compressible gas, such as nitrogen, is introduced through the gas port and is permanently charged and compressed under high pressure in the gas compartment of the accumulator. Then, an incompressible hydraulic liquid under high pressure is pumped through the liquid port into the liquid compartment. The flexible bladder is gradually forced into the gas compartment, as the liquid is pumped into the liquid compartment, thereby compressing the gas in the gas compartment until a balance high pressure is reached in both compartments. In this way, energy is stored or absorbed into the gas compartment of the accumulator, and this energy acts as a spring to force the incompressible hydraulic liquid out through the liquid port, thereby causing the hydraulic liquid to do useful work.

It is the usual practice to provide a spring-loaded poppet valve in the liquid port of the accumulator to prevent the bladder from extruding out of the liquid port after all the liquid has been discharged from the accumulator. Under normal operation, the poppet valve is held open by a spring, and is closed when the bladder engages the valve after all of the liquid has been expelled from the liquid compartment. The closure of the poppet valve prevents the gas pressure from forcing the bladder out through the liquid port.

It is highly desirable to provide an automatic safety device so that when the pressure in the accumulator reaches pressure well over the rated operating pressure of the accumulator, and below the rated burst pressure of the accumulator housing, the opening or mouth of the housing will deform outward, thus extruding the seal of the mouth and relieving the pressure built up in the accumulator. A successful method of accomplishing this is to insert the port and poppet assembly through an opening in the housing, and to seat this assembly on a segmented ring of larger diameter than the opening in the opening in the housing. This segmented ring has a beveled under surface which matches a beveled surface on the inside of the opening of the housing. The result is such that the port and poppet assembly protrude into the housing leaving sharp edges of the segmented ring which can cause damage to the bladder. Therefore, a filler grommet is utilized to cover the segmented ring.

Various types of retainers for the valve assembly have been suggested in the prior art. For example, Mercier U.S. Pat. No. 2,801,067 discloses one type of closure valve for the liquid port of a pressure accumulator which includes a tubular shell, and which is retained in the liquid port by means of a deformable locking ring which engages a shoulder on the valve housing, and which also engages the inner lip of the liquid port.

A subsequent Mercier U.S. Pat. No. 3,439,712 discloses another locking arrangement in which rigid arcuate segments of a retaining ring also engage the lip of the liquid port. The latter retaining ring includes a ring of resilient material which is bonded to the arcuate segments and which extends outwardly around the lip of the liquid port.

Yet another Mercier U.S. Pat. No. 3,148,705 discloses a locking assembly in which the segments of the retaining ring are shaped to extend into an annular recess in the resilient ring, so that the assembly may be held together without the necessity for bonding the resilient ring to the annular segments of the retaining ring. The assembly of the present invention is of the same general type described in this Mercier U.S. Pat. No. 3,148,705, and in the above-identified pending application, in that a resilient ring is held assembled to the arcuate segments of the retaining ring without bonding.

DETAILED DESCRIPTION OF THE ILLUSTRATED EMBODIMENT

Figure 1:
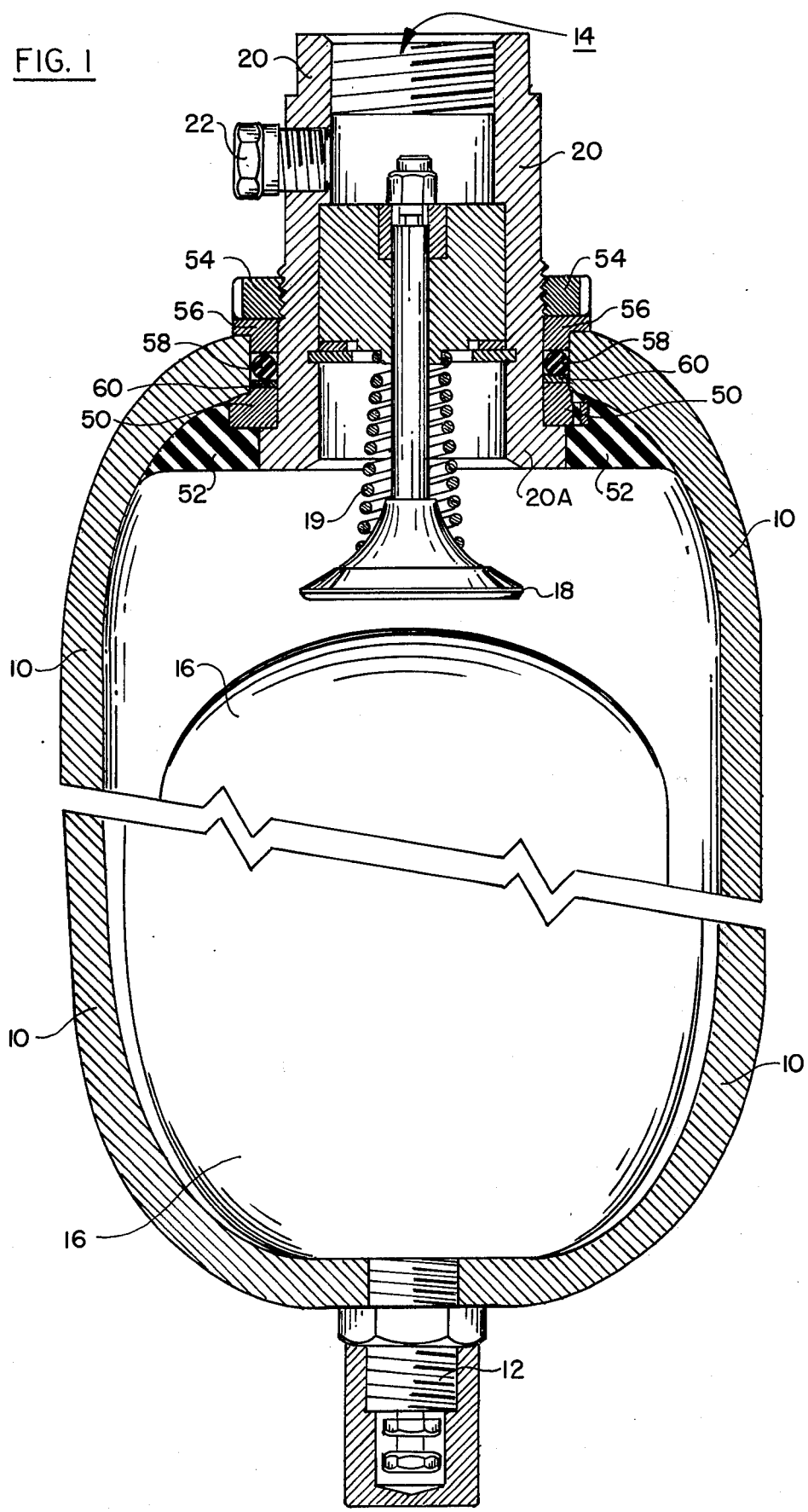
FIG. 1 is a side section showing one embodiment of the grommet assembly of the invention in an assembled condition, and mounted in the liquid port of a typical pressure accumulator.

The pressure accumulator shown in FIG. 1 includes a rigid shell 10 having a valved gas port 12 at one end, and a liquid port 14 at its other end. A thimble-shaped flexible bladder 16 is supported within shell 10 in a manner well understood in the art. A typical spring-loaded poppet valve 18 is mounted within a tubular valve housing 20, the outer diameter of the valve housing being less than the diameter of the opening in the shell 10 in which the housing is mounted. The housing 20 has a flange 20A at its inner end which forms a shoulder, and whose outer diameter is also less than the diameter of the opening in the shell. A plug 22 may be threaded into the wall of housing 20 adjacent the open upper end of the housing. The spring-loaded poppet valve 18 is slidably mounted within the tubular valve housing 20, and it is normally biased to its illustrated open position by spring 19.

It is evident that so long as the valve 18 is in its open position, as illustrated in FIG. 1, hydraulic liquid may flow freely through the liquid port 14 into or out of the interior of shell 10. However, when the flexible bladder 16 is distended to the upper end of the shell, after all the liquid has been discharged out through port 14, it moves against the poppet valve 18, and closes the valve, so as to prevent any tendency for the bladder to be extruded out through the port 14 by the gas pressure in the gas compartment.

As mentioned above, high pressures are developed within the shell 10, and unless appropriate means are provided to hold the valve housing within the liquid port opening 14 at the end of the shell, severe damage and injury could occur. The present invention provides an improved and simple means whereby the various elements of the valve assembly may easily be mounted in the liquid port, and may just as easily be disassembled if so desired.

However, when the valve assembly is mounted in the liquid port 14 by the retaining elements to be described, it is positively and securely held in the liquid port, and any likelihood of its being ejected through the liquid port under normal internal shell pressures is obviated, and yet the assembly will be ejected should the internal shell pressure reach such excessively high values as would otherwise burst the shell.

Figure 2:
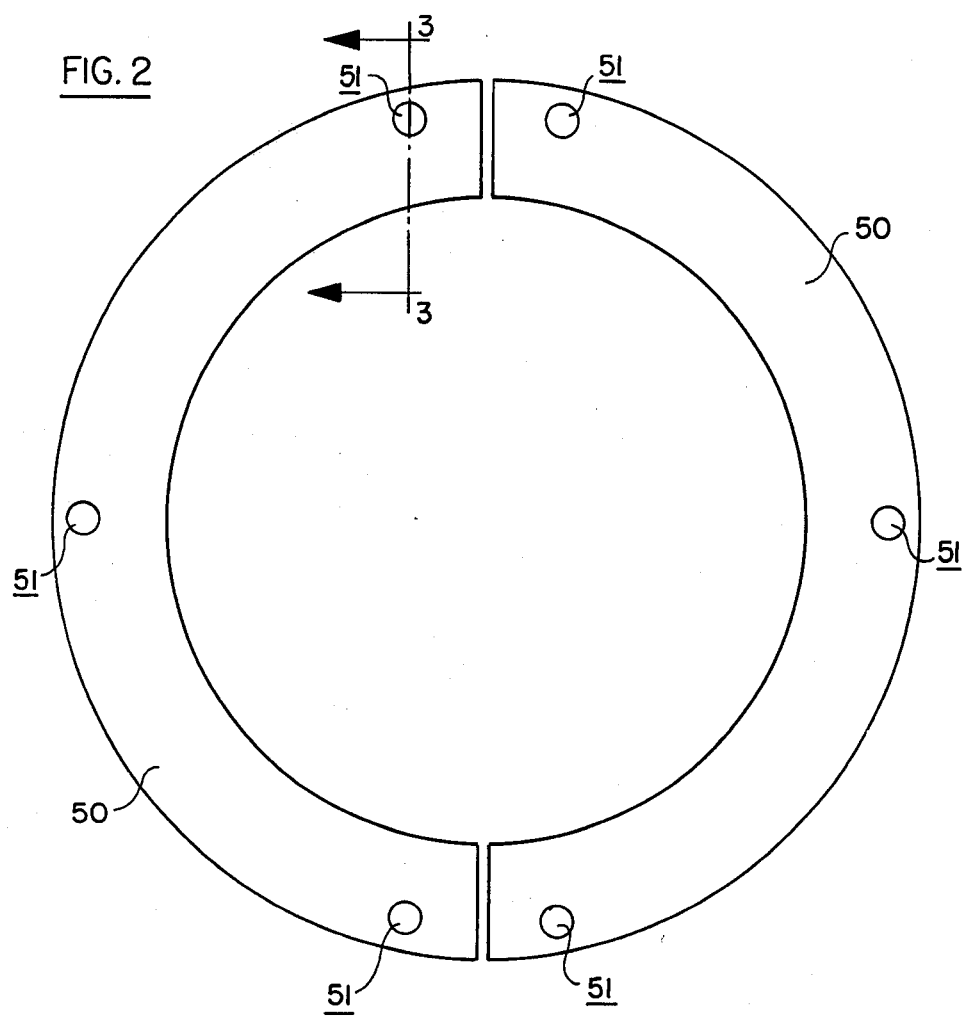
FIG. 2 is a plan view of a retaining ring which is used in the assembly of FIG. 1, and which is made up of two arcuate segments.
Figure 3:
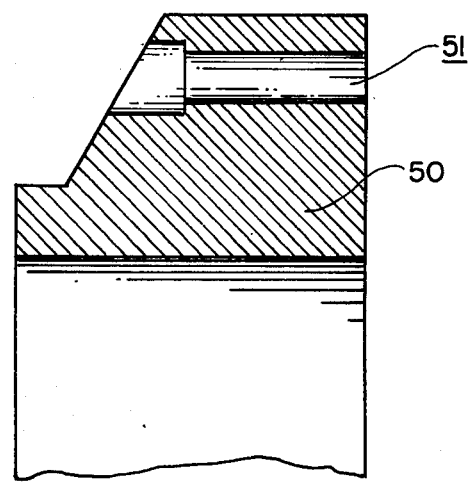
FIG. 3 is a section taken essentially along the line 3—3 of FIG. 2.

The retaining elements include a retaining ring 50 which, as shown in FIGS. 2 and 3, is formed of two arcuated segments, and is shaped to fit coaxially around the tubular valve housing 20 against the shoulder formed by the flange 20A, and to engage the inner surface of the shell 10 around the lip of the liquid port. With the retaining ring 50 in place, it is evident that the possibility of the valve housing 20 being ejected through the liquid port under normal internal pressures is eliminated. The mouth of shell 10 is sealed by a resilient ring 52 which is shaped, as shown in FIGS. 4 and 5 to be fitted over the outer peripheral surface of the flange 20A in coaxial relationship with the valve housing 20, and to engage the inner surface of the shell 10 adjacent the mouth of the liquid port.

The resilient ring 52 may be formed, for example, of Buna "N" synthetic rubber of a hardness factor, for example, of 60 Durometer. The resilient ring 52 is anchored to the segments of the retaining ring 50 by causing it to be extruded through a plurality of holes formed in the retaining ring segments, and which are designated 51 in FIGS. 2 and 3. The resilient ring may be extruded into the holes 51 by any known means.

Figure 4:
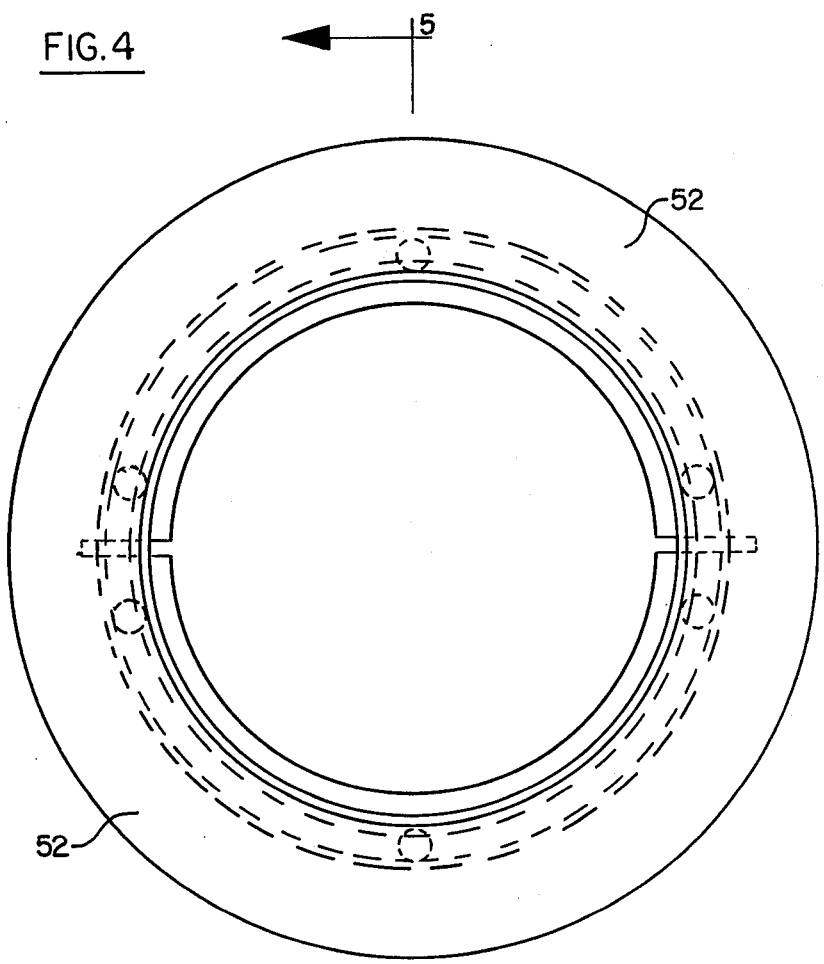
FIG. 4 is a plan view of a sub-assembly comprising the retaining ring of FIGS. 2 and 3, and a resilient ring which is anchored into the retaining ring.
Figure 5:
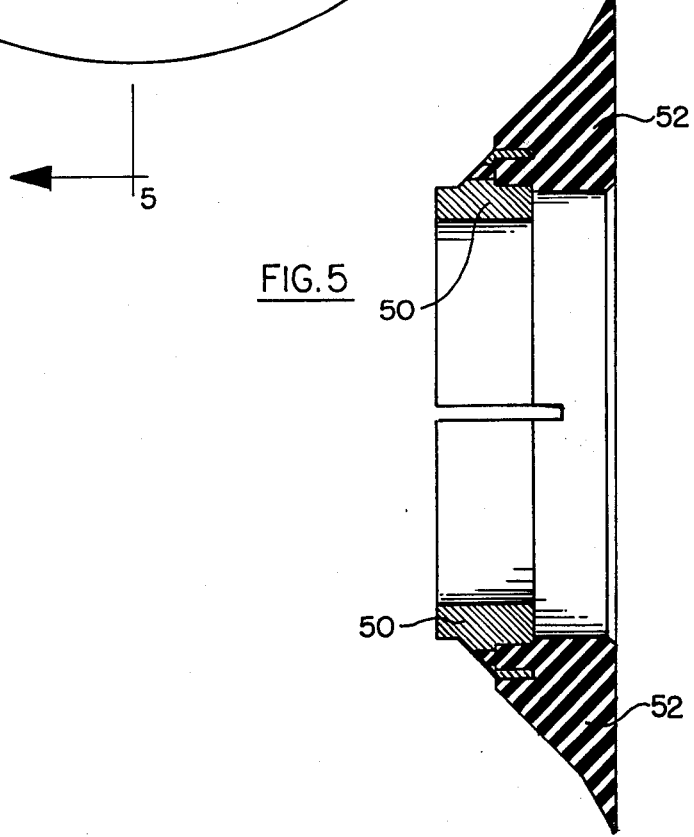
FIG. 5 is a section taken essentially along the line 5—5 of FIG. 4.

The sub-assembly comprising the retaining ring 50 and resilient ring 52 is shown in FIGS. 4 and 5. The sub-assembly is held in place, as shown in FIG. 1, by a lock nut 54 which is threaded to the tubular valve housing 20, and which engages a collar 56. The collar 56, in turn, engages an O-ring seal 58, the O-ring being interposed between the collar and the retaining ring 50, with an appropriate washer 60 being interposed between the O-ring and the retaining ring.

In assembling the valve assembly into the port 14, the sub-assembly comprising the resilient ring 52 and retaining ring 50 is folded over and inserted into the liquid port of shell 10. The tubular valve housing 20 and its internal components, which were previously inserted into the shell, are then pulled into engagement with the retaining ring 50 and resilient ring 52, as shown in FIG. 1. The washer 60, O-ring 58 and collar 56 are then mounted in their illustrated positions in FIG. 1, and the entire assembly is locked in place by the lock nut 54.

The invention provides, therefore, an improved assembly for retaining the poppet valve in the liquid port of a pressure accumulator, without any possibility of the valve being ejected from the port during normal operation of the accumulator.

While a particular embodiment of the invention has been shown and described, modifications may be made. It is intended in the claims to cover the modifications which come within the spirit and scope of the invention.

What is claimed is:

1. A pressure accumulator including a rigid shell having a circular opening at one end thereof, and a valve assembly mounted in the opening, said valve assembly comprising: a tubular housing having an outer diameter less than the diameter of the opening and having a peripheral shoulder formed at the inner end thereof whose outer diameter is less than than the diameter of the opening; a retaining ring formed of a plurality of arcuate segments mounted coaxially with the tubular housing and configured to engage said peripheral shoulder thereof and to engage the inner surface of the shell around the opening; a resilient ring mounted concentrically with the inner end of the tubular housing and having an outer peripheral surface engaging the inner surface of the container, said retaining ring having a plurality of holes extending therethrough, and portions of said resilient ring extending into said holes to anchor said resilient ring to the arcuate segments of the retaining ring.

2. The combination defined in claim 1, and which includes an O-ring seal mounted coaxially with the tubular housing adjacent the outer edge of the retaining ring; a collar mounted coaxially with the tubular housing and engaging the outer side of the O-ring; and a lock nut coaxially threaded to the tubular housing and engaging the outer side of the collar.

* * * * *